Dec. 6, 1960 E. L. WOOD 2,963,324
VEHICLE WHEEL TRIM
Filed Oct. 4, 1957 3 Sheets-Sheet 1
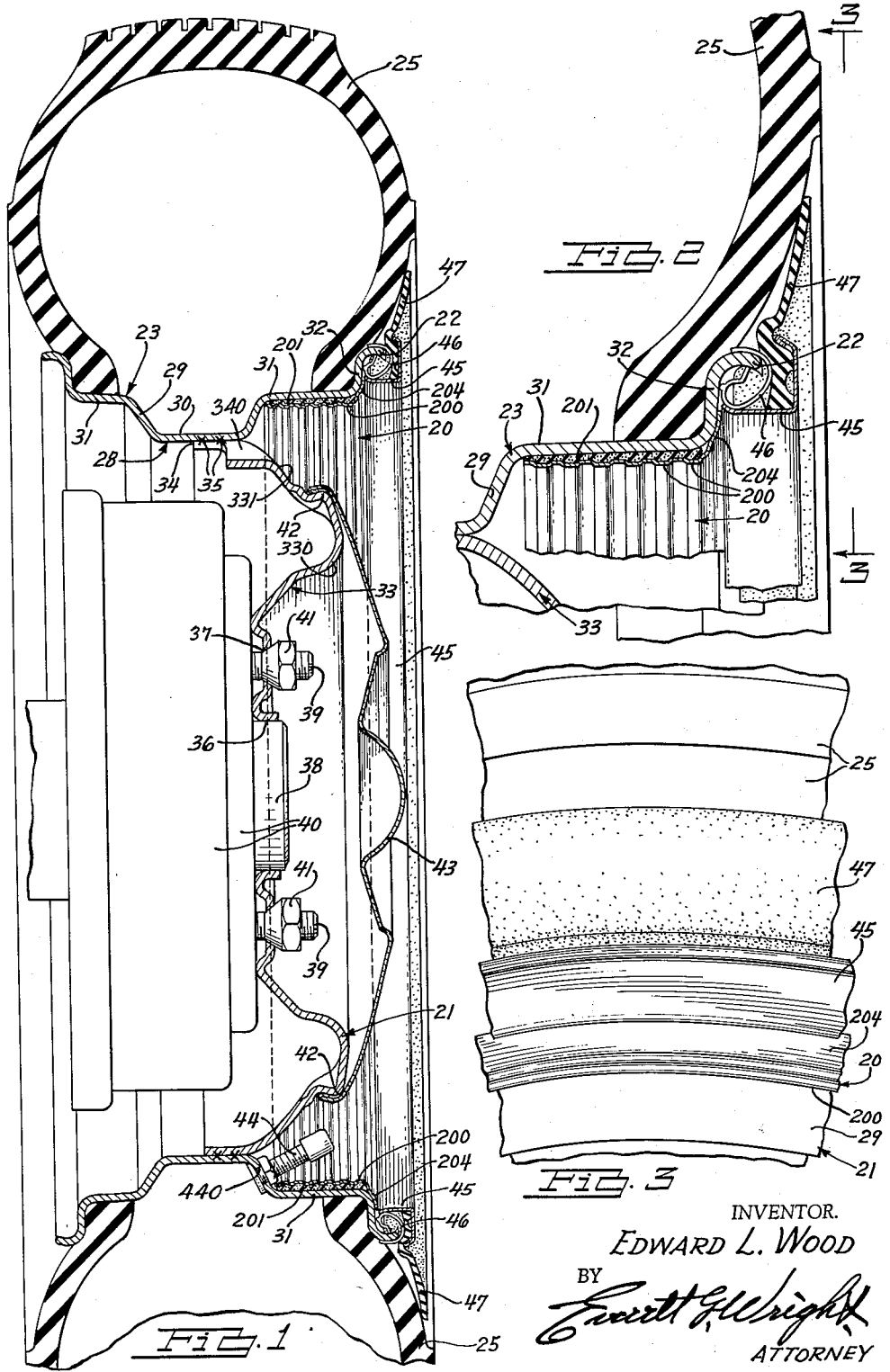
INVENTOR.
EDWARD L. WOOD
BY
ATTORNEY Dec. 6, 1960    E. L. WOOD    2,963,324
VEHICLE WHEEL TRIM
Filed Oct. 4, 1957    3 Sheets-Sheet 2
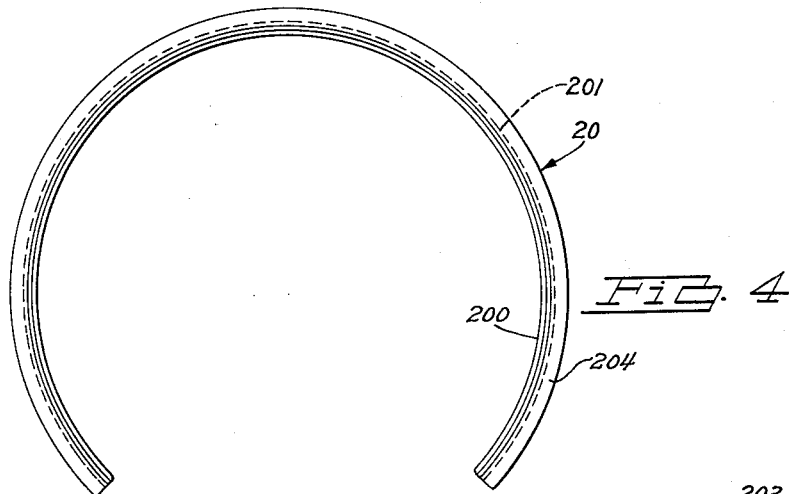
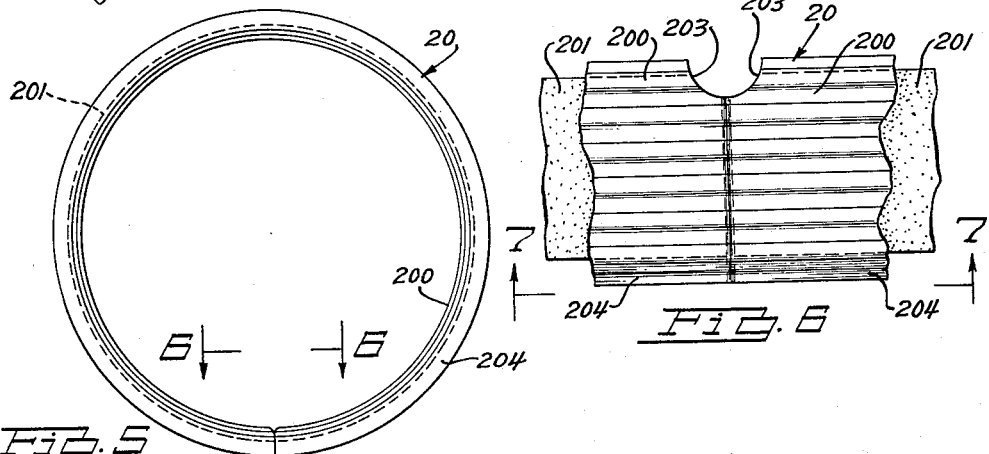
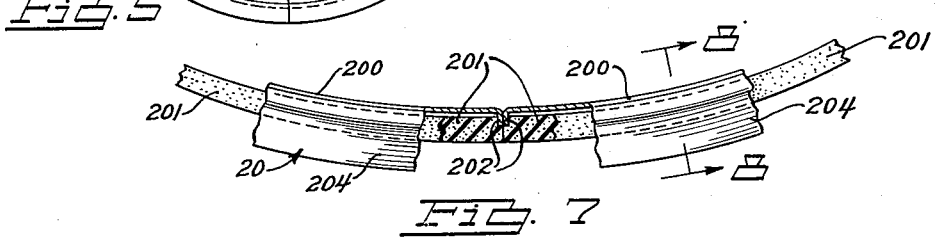
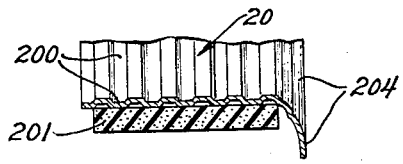
INVENTOR.
EDWARD L. WOOD
BY
ATTORNEY

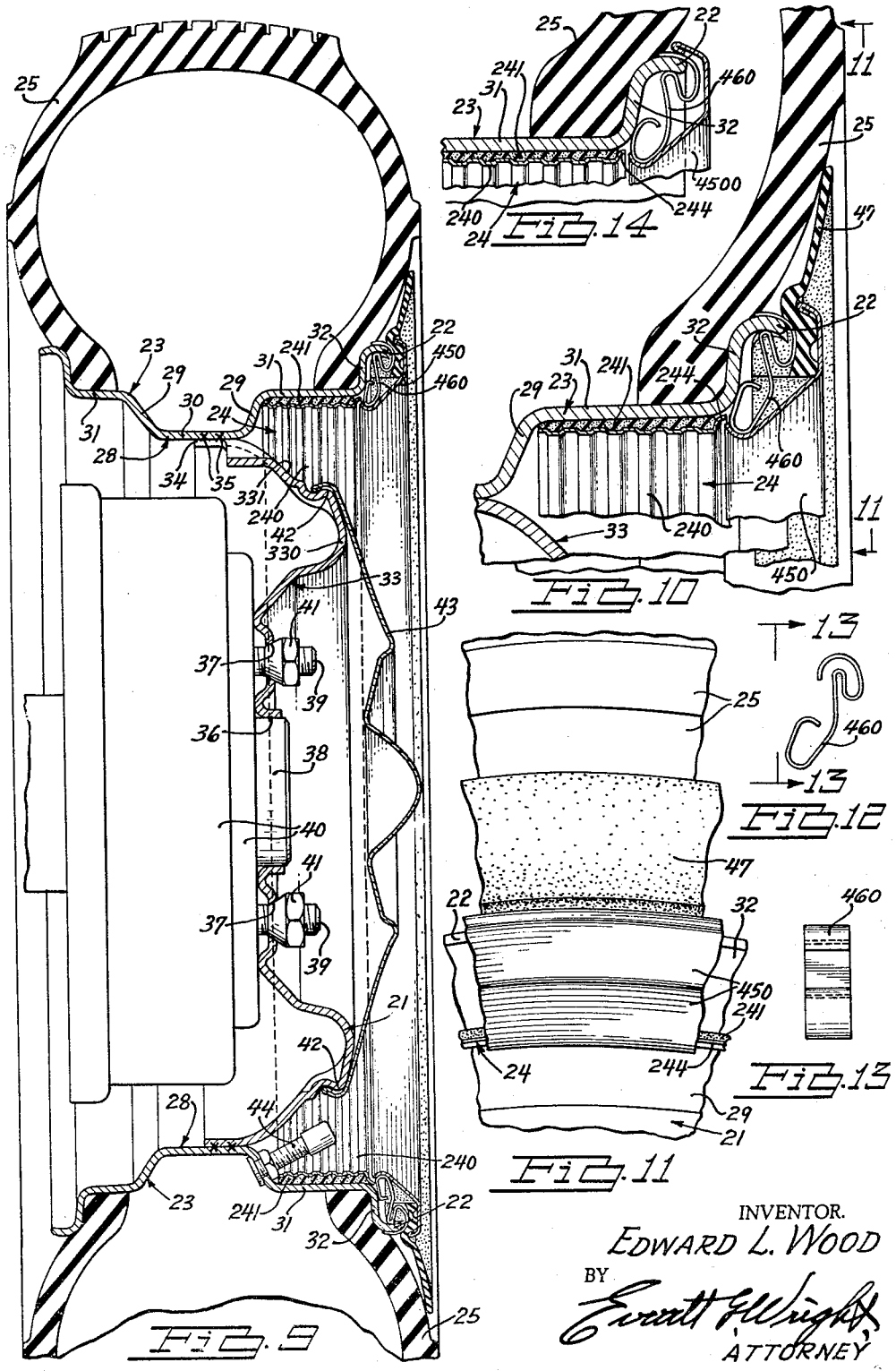

United States Patent Office 2,963,324
Patented Dec. 6, 1960

2,963,324

VEHICLE WHEEL TRIM

Edward L. Wood, 4684 Audubon, Detroit, Mich., assignor of one-half to Charles B. Aske, Jr., Birmingham, Mich.

Filed Oct. 4, 1957, Ser. No. 688,350

4 Claims. (Cl. 301—37)

This invention relates to vehicle wheel trim, and in particular to improved and effective means for trimming a vehicle wheel to provide highly desirable over-all effects not practicable to obtain with conventional wheel trim.

In the prior art various means have been employed to trim vehicle wheels such as hub caps, hub caps with a trim at the outer flange of the wheel rim, and wheel covers. Wheel covers are not only relatively cumbersome but their use generally depreciates the normal wheel effect and give an impression of a more or less hubless disc type wheel. Furthermore, wheel covers generally do not extend over the lip of the wheel rim, particularly when secured to the vehicle wheel by such means as a toothed or fingered band carried by the wheel cover. Wheel covers are expensive to manufacture, and, because of their weight are considered difficult to retain on vehicle wheels when various conventional forms of friction grip or toothed means are employed to removably secure them in place. The use of hub caps and trim at and/or over the outer flange of the wheel rim of vehicle wheels produces a somewhat desirable over-all wheel trim which, although having considerable aesthetic appeal, does not completely meet the demand for a substitute for and improvement over wheel covers.

With the foregoing in view, the primary object of this invention is to provide a wheel trim for vehicle wheels in the form of a rim trim at the underside of the tire bead seat of the wheel rim which, although in itself has desirable aesthetic qualities, is preferably employed on vehicle wheels in combination with hub caps and wheel rim flange trim to effectively trim vehicle wheels thereby serving as an improvement over wheel covers and the like presently employed.

Another object of the invention is to provide a rim trim for the underside of the tire bead seat portion of a vehicle wheel which has patterned reflective qualities to reflect the color of the uncovered portion of the wheel spider outwardly of the hub cap thereby to incorporate a colored striped or other patterned effect without the use of paint or enamel on the rim trim per se.

A further object of the invention is to provide a simple and effective vehicle wheel trim in the form of an ornamental band adapted to spring hold itself in position against the underside of the outer tire bead seat of a modern vehicle wheel to enhance the over-all beauty and aesthetic effect of the vehicle wheel with which other wheel trim means such as hub caps and wheel flange trim may be employed, thusly providing an improvement over expensive, cumbersome and easy-to-lose wheel covers.

Other objects of the invention will become apparent by reference to the following detailed description taken in connection with the accompanying drawings wherein:

Fig. 1 is a vertical sectional view through a vehicle wheel and tire having thereon rim trim embodying the invention showing its relationship and combination with a vehicle hub cap and a wheel flange trim that may be employed therewith to effectively trim the entire wheel.

Fig. 2 is an enlarged fragmentary cross sectional view showing in more detail the embodiment of the invention disclosed in Fig. 1.

Fig. 3 is a fragmentary elevational view taken on the line of 3—3 of Fig. 2.

Fig. 4 is an elevational view of the rim trim as manufactured but before being sprung into circular shape for installation onto a vehicle wheel.

Fig. 5 is an elevational view similar to Fig. 4 showing the rim trim after installation onto a vehicle wheel.

Fig. 6 is an enlarged fragmentary elevational view taken on the line 6—6 of Fig. 5, portions being broken away to clearly illustrate the construction.

Fig. 7 is an enlarged fragmentary elevational view taken on the line 7—7 of Fig. 6, portions also being broken away to illustrate a preferred construction.

Fig. 8 is a cross sectional view taken on the line 8—8 of Fig. 7.

Fig. 9 is a vertical sectional view similar to Fig. 1 showing a modification of the invention employed with a relatively wide wheel flange trim.

Fig. 10 is an enlarged fragmentary cross sectional view showing in more detail the modification of the invention disclosed in Fig. 9.

Fig. 11 is a fragmentary elevational view taken on the line 11—11 of Fig. 10.

Fig. 12 is a side elevational view of a securing clip for the relatively wide wheel flange trim shown in Figs. 9 and 10 before being sprung over the lip of the wheel rim.

Fig. 13 is a rear elevational view of the said securing clip taken on the line 13—13 of Fig. 12.

Fig. 14 is an enlarged fragmentary cross sectional view similar to Fig. 10 showing the use of the invention in combination with wheel flange trim which is not also employed to retain tire trim means in place.

Referring now to the drawings wherein like numerals refer to like and corresponding parts throughout the several views, a rim trim 20 embodying the invention is disclosed in connection with a typical modern vehicle wheel 21 including a tubeless tire 25 mounted thereon. The said vehicle wheel 21 has a drop center rim 23 composed of a central channel or drop center 28 having side walls 29 and a base 30. An annular tire bead seat 31 extends laterally outwardly from each side of the side walls 29 of the drop center 28 terminating in a tire bead seat flange 32 extending upwardly therefrom which is curbed at its upper portion to form an axially disposed outer lip 22. The said tire bead seat flange 32 is often referred to as the wheel flange. Within the center of the drop center rim 23 is a spider 33 having an axially disposed flange 34 which generally is secured to the central channel 28 of the drop center rim 23 by such means as welding at 35. The spider 33 is provided with a central hub aperture 36 with securing stud holes 37 therearound to accommodate respectively the wheel hub 38 and wheel securing studs 39 extending from the brake drum 40 to which the wheel 21 is secured by means of the usual wheel securing nuts 41.

The flange 34 of the spider 33 is generally scalloped out and formed at 340 at intervals around the periphery thereof to provide added structural strength to the vehicle wheel 21. The spider 33 is generally formed with an annular axially extending outer spider collar 330 which is provided with a plurality of hub cap retainer nubs 42 over which the hub cap 43 is sprung for securement onto the vehicle wheel 21. The said spider collar 330 has an annular exposed painted surface 331 extending from the outer periphery of the hub cap 43 to the bottom of the painted central channel or drop center 28 of the vehicle wheel 21 adjacent the outer side wall 29 thereof. The particular tire 25 illustrated in the drawings is a modern tubeless tire, and, if a tubeless tire 25 is used on the vehicle wheel 21, a valve stem 44 is mounted in sealed relationship through the valve stem aperture 440 provided in a wall 29 of the drop center rim channel 28 of the said wheel 21.

Referring now particularly to the embodiment of the invention disclosed in Figs. 1–8 inclusive, the vehicle wheel 21 is provided with a rim trim 20 consisting of a generally circularly formed open end band 200 of chrome plated steel or stainless steel or other material having high reflective qualities which is preferably lined with a sponge rubber or other compressible resilient cushion strip 201. The said rim trim 20 is sprung from its generally circular open end form indicated in Fig. 4 having a radius somewhat greater than the radius of the tire bead seat 31 to a circular shape such as will permit it to be telescoped axially over the bottom or radially inner face of the axially outer annular tire bead seat 31 of the wheel rim 23. The said rim trim 20 is sprung radially and circumferentially outwardly into an intimate contact with the said tire bead seat 31 whereupon the said cushion strip 210 becomes compressed into a firm surface contact with the radially inner face of the said tire bead seat 31. The open ends of the said circularly formed rim trim band 200 are preferably bent to provide transverse end flanges 202 which abut each other as shown in Figs. 6 and 7 when the rim trim 20 is properly positioned on a vehicle wheel. The length of the said generally circularly formed rim trim band 200 is such that, when the said band 200 is sprung within the tire bead seat 31 of the vehicle wheel 21, it will expand or can be expanded into a complete circular form with its ends or end flanges 202 in substantial abutment. The said rim trim band 200 is scalloped out at its abutting ends as indicated at 203 to permit it to accommodate itself to the tire valve stem 44 by fitting partially therearound as the said rim trim 20 is mounted on the vehicle wheel 21.

The rim trim band 200 of the rim trim 20 is suitably deformed as by ribbing it longitudinally as indicated throughout the drawings. This ribbing or other deformation of the rim trim band 200 is such as to cause it to pick up by reflection the color of the annular exposed surface 331 of the collar 330 of the wheel spider 33 providing, in the case of a longitudinally ribbed rim trim 20, a striped effect. When stainless steel or chrome plated rim trim 20 is used, it is preferable to employ a pattern of the deformations therein which maintains the chrome effect in part and reflects the color of the wheel spider 33 in part. For example, when chrome plated, polished aluminum or stainless steel is used for the said rim trim 20, a striped effect is obtained consisting of alternate stripes of stainless steel or chrome and the color reflected from the portion 331 of the collar 330 of the wheel spider 33. Furthermore, by using anodized aluminum or plastic as a material for the rim trim 20, and/or by employing rib, waffle, diamond, tear drop or other embossing or debossing, many and varied rim trim effects may be obtained.

The arcuately formed band 200 of the rim trim 20 may be provided with a radially outwardly extending outer circumferential lip 204 as best shown in Figs. 1–8 inclusive which extends partially up the tire bead seat flange 32 extending radially outwardly from the tire bead seat 31 over the bottom of which the said rim trim is positioned. The extreme outer periphery of the said circumferential lip 204 of the rim trim 20 is preferably juxtaposed to the inner periphery of a wheel flange trim indicated by the numeral 45 in Figs. 1, 2 and 3. This wheel flange trim 45 is shown in the drawings to be of one of several well known types of wheel trim, the particular wheel flange trim 45 being secured to the rim 23 of the vehicle wheel 21 by such means as a plurality of spring clips 46. The wheel flange trim 45 is shown holding tire trim 47 in place over the lip 22 of the wheel flange 32. Obviously, any desired wheel flange trim 45 may be employed in combination with the rim trim 21 to provide, together with the hub cap 43 and the painted exposed surface 331 of the wheel spider 33, a most pleasing and desirable wheel trim with deep reflected striped or other pattern effect not otherwise obtainable economically on vehicle wheels. Accordingly, the invention provides a rim trim 20 which not only trims the tire bead seat 31 of a modern vehicle wheel, but the said rim trim 20 cooperates with wheel flange trim 45 and the hub cap 43 to provide a new and economical over-all wheel trim not possible to attain with conventional wheel covers.

In the modification of the invention illustrated in Figs. 9–13 inclusive, the rim trim 24 is like and similar to the rim trim 20 with the exception that the circularly formed band 240 thereof is provided with a narrow circumferential lip 244 rather than a wide circumferential lip 204 as employed on the arcuately formed band 200 of the rim trim 20. The said circularly formed band 240 of the rim trim 24 is provided with a compressible resilient cushioning strip 241. The other details of the rim trim 24 such as the abutting flanges and the scallops employed to accommodate the tire valve stem 44 are preferably like and similar to the like details of the rim trim 20. The said modification of the invention as shown in Figs. 9–13 inclusive indicates how the rim trim 24 is formed to accommodate it to being juxtaposed to a wheel flange trim 450 which is somewhat wider and deeper than the wheel flange trim 45 shown in the embodiment of the invention disclosed in Figs. 1–8 inclusive.

It will be noted that it is preferable that the clip means 460 be employed to removably secure the wheel flange trim 450 to the wheel flange 32 of the vehicle wheel 21 are so formed as to hold the inner periphery of the said wheel flange trim 450 spaced from the circumferential lip 244 of the rim trim 24 whereby to avoid any minute relative rubbing of the wheel flange trim 450 and the rim trim 24 with respect to each other when the vehicle wheel 21 weaves under load. The avoidance of such rubbing is desirable inasmuch as it eliminates squeaking that might otherwise occur during driving of a vehicle having its wheels equipped with rim trim.

Fig. 14 shows the relationship of wheel flange trim 4500 to the wheel flange 32 and to the rim trim 24 when the wheel flange trim 4500 is not employed to hold tire trim means onto the wheel flange 32.

Although but a single embodiment of the invention and one modification thereof have been disclosed and described in detail, it is obvious that many changes may be made in the size, shape, arrangement and detail of the various elements of the invention as defined by the appended claims.

I claim:

1. In combination with a vehicle wheel including a spider and a rim having an annular tire bead seat, means trimming said vehicle wheel comprising a circularly formed open end rim trim band substantially the width of the said tire bead seat of resilient patterned reflective material having a radius somewhat greater than the radius of said tire bead seat, a relatively soft compressible cushion strip substantially coextensive with the width of the said tire bead seat applied to the back of said circularly formed rim trim band, the said rim trim band being of such a length that when it is manually sprung within and radially expanded toward the tire bead seat the cushion backing thereof becomes compressed against the said tire bead seat and the ends thereof become positioned in substantial abutment.

2. In combination with a vehicle wheel including a spider painted to a selected color and a rim having an annular tire bead seat, means trimming said vehicle wheel comprising a circularly formed open end rim trim band of resilient patterned reflective material substantially the width of the said tire bead seat having a radius somewhat greater than the radius of said tire bead seat, a relatively soft compressible cushion strip substantially coextensive with the width of the said tire bead seat applied to the back of said circularly formed rim trim band, the said rim trim band being provided with transverse end flanges at the open ends thereof disposed normal thereto, the said rim trim band being of such a length that when it is manually sprung within the said tire bead seat the cushion backing thereof is compressed against the said tire bead seat and the said transverse end flanges thereof abut each other, the pattern in said reflective material being such as to cause said rim trim to reflect said pattern partly in any color contrasting with said rim trim to which the said spider may be painted.

3. In combination with a vehicle wheel including a spider painted to a color contrasting with chrome finish, a rim having a flange and an annular tire bead seat, a chrome finish hub cap and a chrome finish wheel flange trim, means trimming said vehicle wheel in combination with said wheel flange trim comprising a circularly formed and ribbed open end rim trim band of resilient reflective material having a chrome finish and a radius somewhat greater than the radius of said tire bead seat, a relatively soft compressible cuhion strip applied to the back of said circularly formed rim trim band, the said rim trim band being of such a length and width that when manually sprung within and radially expanded against the said tire bead seat the cushion backing thereof becomes compressed against the tire bead seat and the ends thereof become positioned in substantial abutment, the axial outer periphery of of said rim trim band being formed to extend to said wheel flange trim covering that portion of the wheel rim between the tire bead seat and the wheel flange trim, the said ribbing in said rim trim band being such as to cause said rim trim to reflect stripes in the color of said painted spider.

4. In combination with a vehicle wheel including a spider painted to a selected color and a rim having an annular tire bead seat, means trimming said vehicle wheel comprising a circularly formed open end rim trim band substantially the width of said tire bead seat of resilient bright ribbed stainless steel having a radius somewhat greater than the radius of said tire bead seat, a relatively soft compressible cushion strip substantially coextensive with the width or said tire bead seat applied to the back of said circularly formed rim trim band, the said rim trim band being provided with transverse end flanges at the open ends thereof disposed normal thereto, the said rim trim band being of such a length that, when manually sprung within the said tire bead seat and the cushion backing thereof is compressed against the said tire bead seat, the said transverse end flanges thereof become registered in abutment with each other, the ribbing in said rim trim band being such as to cause said rim trim to reflect alternate stripes in any color contrasting with said rim trim to which the said spider may be painted.

References Cited in the file of this patent

UNITED STATES PATENTS

| | | |
|---|---|---|
| 752,775 | Hinkel | Feb. 23, 1904 |
| 1,948,272 | Lyon | Feb. 20, 1934 |
| 1,985,378 | Lyon | Dec. 25, 1934 |
| 2,082,803 | Lyon | June 8, 1937 |
| 2,124,789 | Lyon | July 26, 1938 |
| 2,214,745 | Lyon | Sept. 17, 1940 |
| 2,366,067 | Smith | Dec. 26, 1944 |
| 2,367,834 | Kuhn | Jan. 23, 1945 |
| 2,368,232 | Aske | Jan. 30, 1945 |
| 2,441,008 | Chase | May 4, 1948 |
| 2,618,513 | Horn | Nov. 18, 1952 |
| 2,749,184 | Wood | June 5, 1956 |
| 2,785,382 | Lamb | Mar. 12, 1957 |

FOREIGN PATENTS

| | | |
|---|---|---|
| 726,836 | Great Britain | Mar. 23, 1955 |